(No Model.)
F. HOLDEN.
VOLTMETER.
No. 550,682.
Patented Dec. 3, 1895.
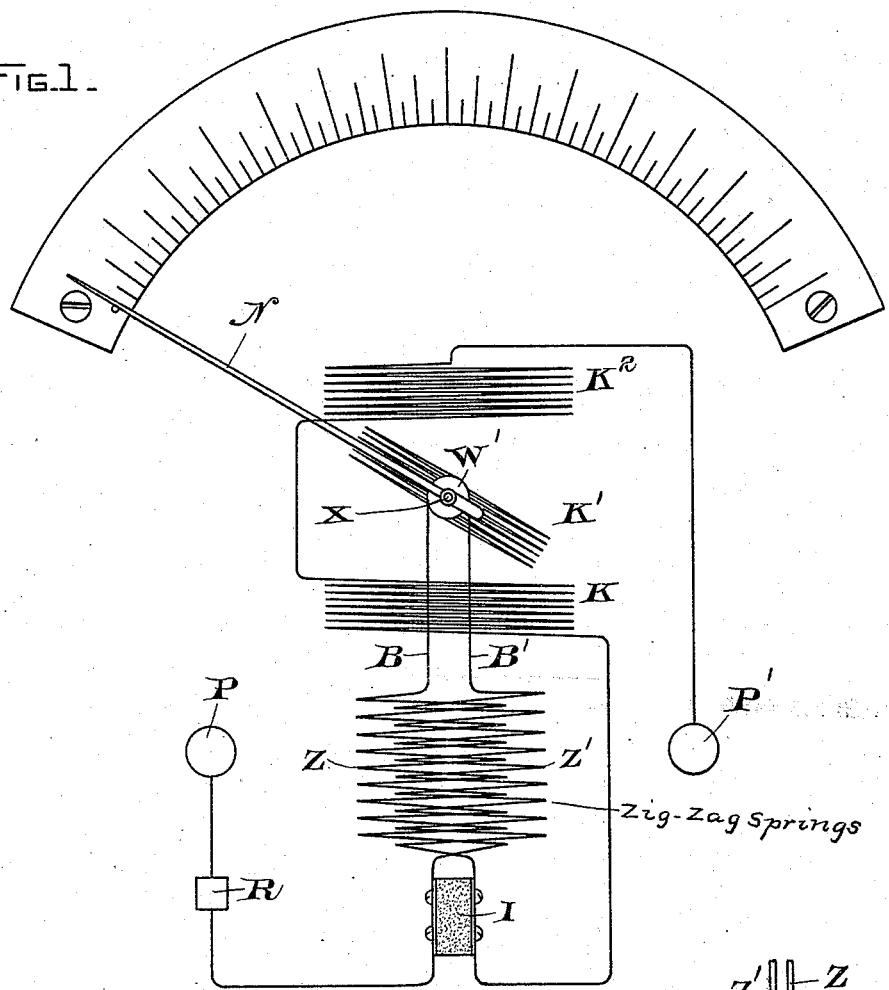
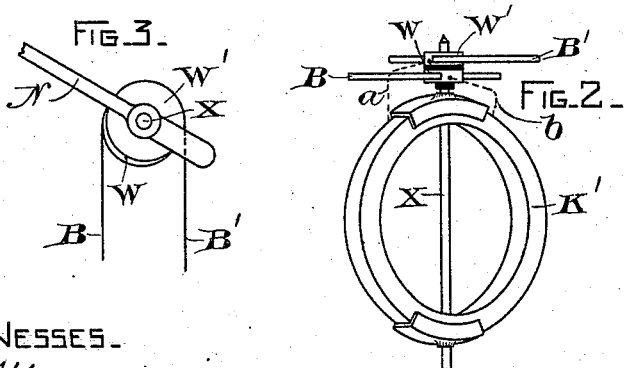
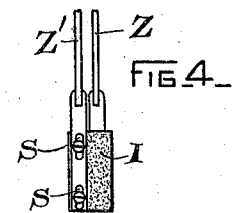
WITNESSES—
A. F. Macdonald.
B. B. Hull
INVENTOR—
Frank Holden, by
Geo. R. Blodgett,
Atty.

UNITED STATES PATENT OFFICE.

FRANK HOLDEN, OF SCHENECTADY, NEW YORK, ASSIGNOR TO THE GENERAL ELECTRIC COMPANY, OF NEW YORK.

VOLTMETER.

SPECIFICATION forming part of Letters Patent No. 550,682, dated December 3, 1895.

Application filed August 31, 1895. Serial No. 561,069. (No model.)

*To all whom it may concern:*

Be it known that I, FRANK HOLDEN, a citizen of the United States, residing at Schenectady, in the county of Schenectady, State of New York, have invented certain new and useful Improvements in Voltmeters, of which the following is a specification.

My invention relates to voltmeters, and has for its object to provide a cheap and simple voltmeter which can be used upon either alternating or direct current circuits and which allows any desired portion of the scale to be arranged with increased space between the divisions, so that precise readings of potential can be more quickly made at those portions of the scale within the limits of working potential in any particular case.

The accompanying drawings illustrate my invention, and therein—

Figure 1 is a diagrammatic view in elevation of my improved voltmeter. Fig. 2 is an enlarged detail showing the connections of the coil K'. Fig. 3 shows how I may magnify the scale-markings in the action of the instrument itself, and Fig. 4 shows the adjustment in calibrating the readings.

In the drawings, K K' K² are fine-wire coils connected in series between the terminal binding-posts P P', the polar axis of the coil K' existing at an angle with that of the coils K K², which latter lie in parallel planes, as usual in such instruments. The connection of the coil K' to the circuit must of course be made so as to offer the least possible opposition to its movement. Such a connection has been heretofore made through contacts dipping in mercury and in other cases through two spiral springs, one end of each of which is connected to the spindle X and its other end to a stationary part of the instrument, such springs being usually in opposition. In my invention, however, I obtain connection through two flat zigzag springs Z Z', one end of each being attached to a stationary insulating-piece I and the other being connected to extremely thin and flexible metal strips or bands B B', which pass partly around small hubs or rings W W' and are secured thereto, as by soldering. One of the rings is electrically connected with the spindle or axis X, which supports the coil K', and the other, W, is insulated therefrom, as indicated, the terminals *a b* of the coil K' being connected to these two rings, respectively. The other ends of the springs Z Z' are soldered or secured to heavier pieces, as seen in Fig. 4, slotted at S S, whereby the tension of the springs may be adjusted. The springs Z Z' are made with a considerable length between the bends, so as to yield readily. The needle N is brought to the zero position by properly adjusting the pull of the springs Z Z'. The coils K K² are wound in the same direction, and the coil K' is wound in a reverse direction, or so as to be deflected when current passes through the coils and to tend to take a position parallel with K K² against the restraining action of the springs Z Z'. The degree of deflection may be measured upon a suitable scale in the usual way, indicating the potential difference existing between the terminals P P' either directly or in degrees and being then reduced to volts by the usual comparison-tables.

In order to increase the range of traverse of the pointer or needle N at any desired position of the scale for any given variation of potential, I may make one of the wheels W W' eccentric or shaped so as to change the leverage of one of the springs Z Z' as they move from their normal position, decreasing the leverage of said spring when the range is to be increased and increasing it when the range is to be decreased. Thus in Fig. 3 the wheel W is so shaped that one of the springs Z Z' has the greatest leverage when the needle is about at the middle portion of the scale, and therefore the movements of the needle will be amplified at one portion of the scale and lessened at another for a given variation of potential between P and P'.

An accessory or artificial resistance R may be placed in series with the coils K K' K², if desired, to limit the current. Such coils may also be divided into sections, which can be connected in series or parallel to adapt the instrument to measure extremes of potential.

What I claim as new, and desire to secure by Letters Patent of the United States, is—

1. In an electric measuring instrument, the combination of field coils, an indicating coil mounted upon a shaft and provided with an index, hubs also mounted upon the shaft and connected to the terminals of the indicating coil, and zigzag flat springs secured at one end to the hubs and at the other to circuit terminals, as set out.

2. In an electric measuring instrument, the combination of field coils, an indicating coil mounted upon a shaft and provided with an index, hubs also mounted on the shaft and connected to the terminals of the indicating coil, and zigzag flat springs secured at one end to the hubs and at the other to circuit terminals, such springs being provided with an adjustment at one end, as set forth.

3. In an electric measuring instrument, the combination of field coils, an indicating coil mounted upon a shaft and provided with an index, hubs mounted upon the shaft and connected to the terminals of the indicating coil, one of said hubs being eccentric, a scale over which the index reciprocates, and flat springs secured at one end to the hubs and at the other to circuit terminals; whereby the movement of the index may be exaggerated on the scale, as set forth.

4. In an electric measuring instrument, the combination of field coils, an indicating coil mounted upon a shaft and provided with an index, hubs mounted upon the shaft and connected to the terminals of the indicating coil, one of said hubs being eccentric, a scale over which the index reciprocates, and flat springs secured at one end to the hubs and at the other to circuit terminals, and provided with an adjustment at one end, substantially as described.

5. In an electric measuring instrument, as a means of conveying current to the indicating coil, the flat zigzag springs Z, Z'.

In witness whereof I have hereunto set my hand this 29th day of August, 1895.

FRANK HOLDEN.

Witnesses:
B. B. HULL,
A. F. MACDONALD.